United States Patent
Kuiper

(10) Patent No.: US 9,296,564 B2
(45) Date of Patent: Mar. 29, 2016

(54) SUPPORT BED ASSEMBLY FOR CONVEYOR BELTS AND SLIDER BARS THEREFOR

(75) Inventor: Daniel J. Kuiper, Alto, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 268 days.

(21) Appl. No.: 13/451,298

(22) Filed: Apr. 19, 2012

(65) Prior Publication Data

US 2013/0277181 A1 Oct. 24, 2013

(51) Int. Cl.
*B65G 15/62* (2006.01)

(52) U.S. Cl.
CPC ............ *B65G 15/62* (2013.01); *B65G 2207/48* (2013.01); *Y10T 29/49947* (2015.01)

(58) Field of Classification Search
CPC ..................................................... B65G 15/62
USPC .................. 198/841, 818, 821, 823
See application file for complete search history.

(56) References Cited

U.S. PATENT DOCUMENTS

| 2,038,471 | A | * | 4/1936 | Benatar | 198/860.5 |
|---|---|---|---|---|---|
| 2,974,777 | A | | 3/1961 | Marsh | |
| 4,556,143 | A | * | 12/1985 | Johnson | 198/841 |
| 4,793,470 | A | * | 12/1988 | Andersson | B65G 15/62 198/823 |
| 4,898,272 | A | * | 2/1990 | Swinderman et al. | 198/841 |
| 4,932,516 | A | | 6/1990 | Andersson | |
| 5,007,528 | A | | 4/1991 | Hideharu | |
| 5,038,924 | A | | 8/1991 | Stoll | |
| 5,103,967 | A | | 4/1992 | Stoll | |
| 5,131,530 | A | | 7/1992 | Rappen | |
| 5,350,053 | A | | 9/1994 | Archer | |
| 5,368,154 | A | | 11/1994 | Campbell | |
| 5,799,780 | A | | 9/1998 | Steeb, Jr. et al. | |
| 5,813,513 | A | | 9/1998 | Taube | |
| 5,988,360 | A | | 11/1999 | Mott | |
| 6,454,083 | B2 | | 9/2002 | Burkhart et al. | |
| 6,913,138 | B2 | * | 7/2005 | Wiggins | 198/841 |
| 7,527,144 | B2 | * | 5/2009 | Ostman | 198/823 |
| 7,815,040 | B2 | | 10/2010 | Kuiper et al. | |
| 2004/0079621 | A1 | | 4/2004 | Mott | |
| 2009/0280288 | A1 | | 11/2009 | Yaver | |
| 2010/0072033 | A1 | * | 3/2010 | Daly et al. | 198/836.1 |

OTHER PUBLICATIONS

MiniTec Framing Systems, LLC, copyright 2009, "Slide Bar 8", see p. 1 of 2, Part. No. 22.1088.*
National Conveyor, copyright 2011, "Load Zone Support and Return Roller Guard", see p. 1 of 2; see "Load Zone".*
Altech Catalog, "Accessories", Nov. 16, 2009.*
Internet Archive Capture of Altech Catalog, Nov. 16, 2009.*
MiniTec*

(Continued)

*Primary Examiner* — Gene Crawford
*Assistant Examiner* — Lester Rushin
(74) *Attorney, Agent, or Firm* — Fitch, Even, Tabin & Flannery LLP

(57) ABSTRACT

A support bed assembly, either of the impact or non-impact type, having relatively low cost slider bar assemblies is provided. The slider bar assemblies have a two-piece body including an elongate upper slide member and an elongate lower base member that have a slide fit for connecting the upper slide member to the lower base member to extend longitudinally therealong. The upper slide member is removably connected to the lower base member to allow for replacement thereof due to wear.

26 Claims, 12 Drawing Sheets

(56) References Cited

OTHER PUBLICATIONS

MiniTec Framing Systems, LLC, Copyright 2009, "Slide Bar 8", p. 1 of 2, Part. No. 22.1088, second illustration.*

Notification of Transmittal of the International Search Report and the Written Opinion of the International Searching Authority, or the Declaration from the International Bureau of WIPO for corresponding International Application No. PCT/US2013/035265, dated Aug. 6, 2013, 14 pages.

* cited by examiner

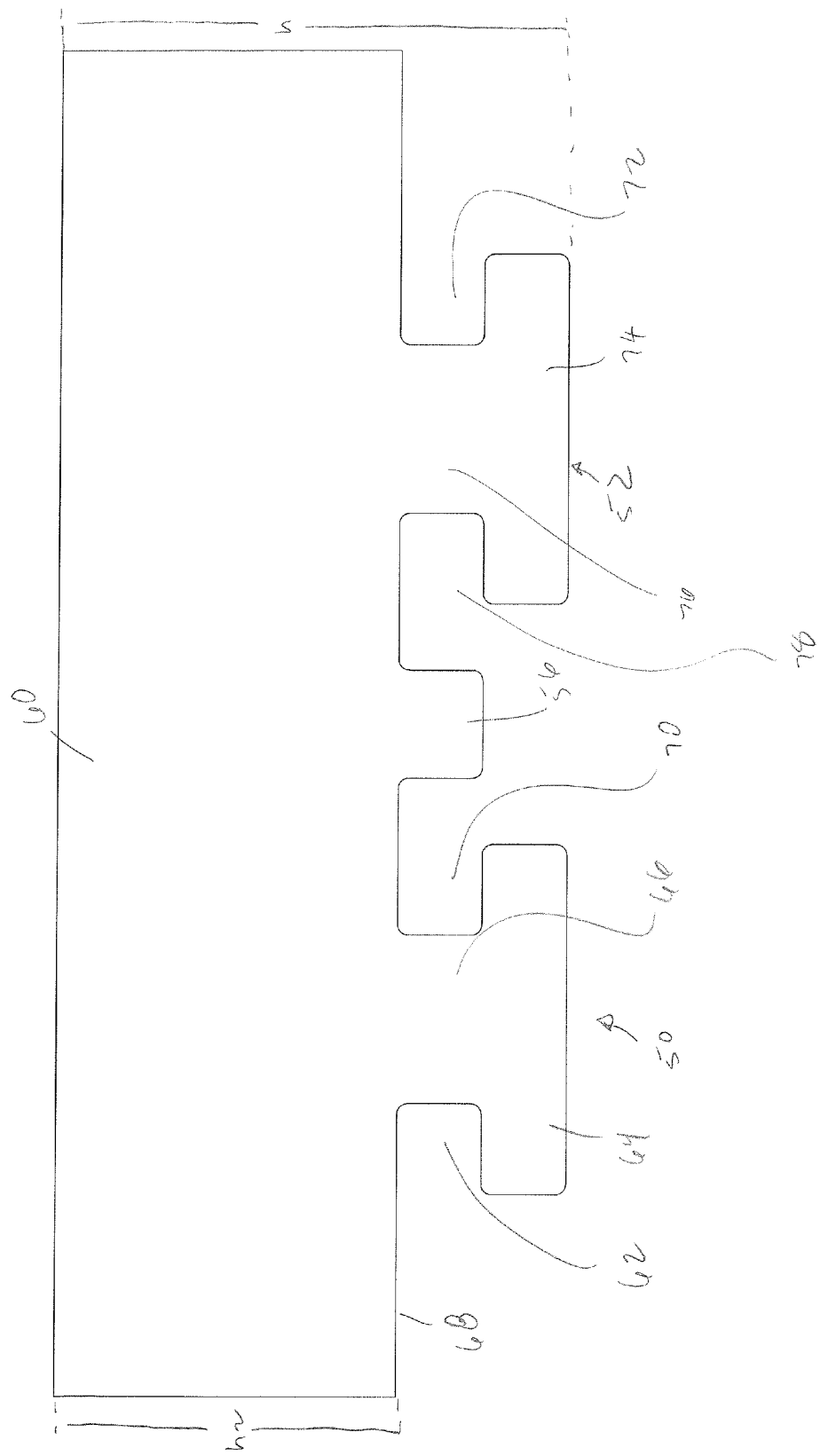

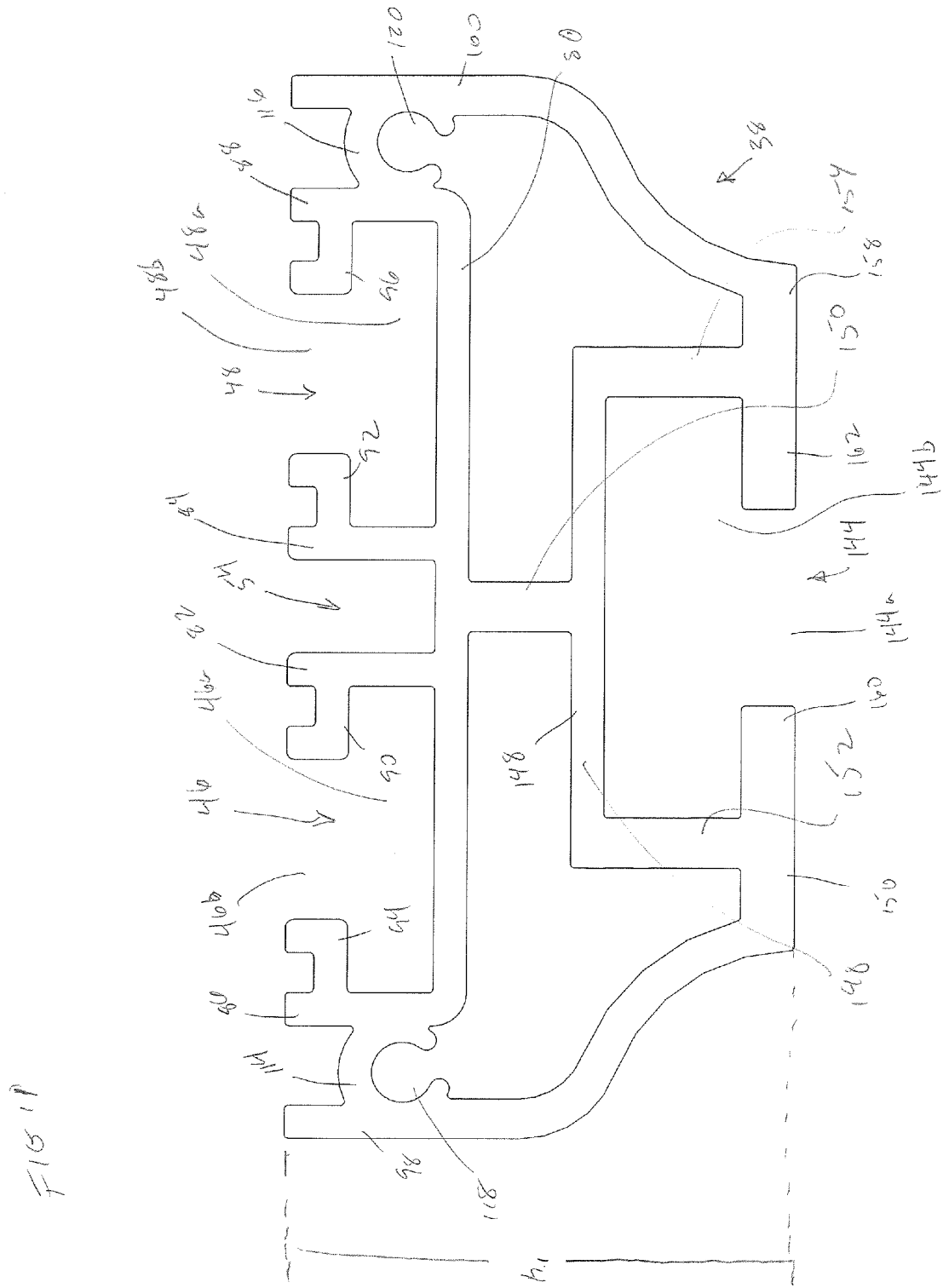

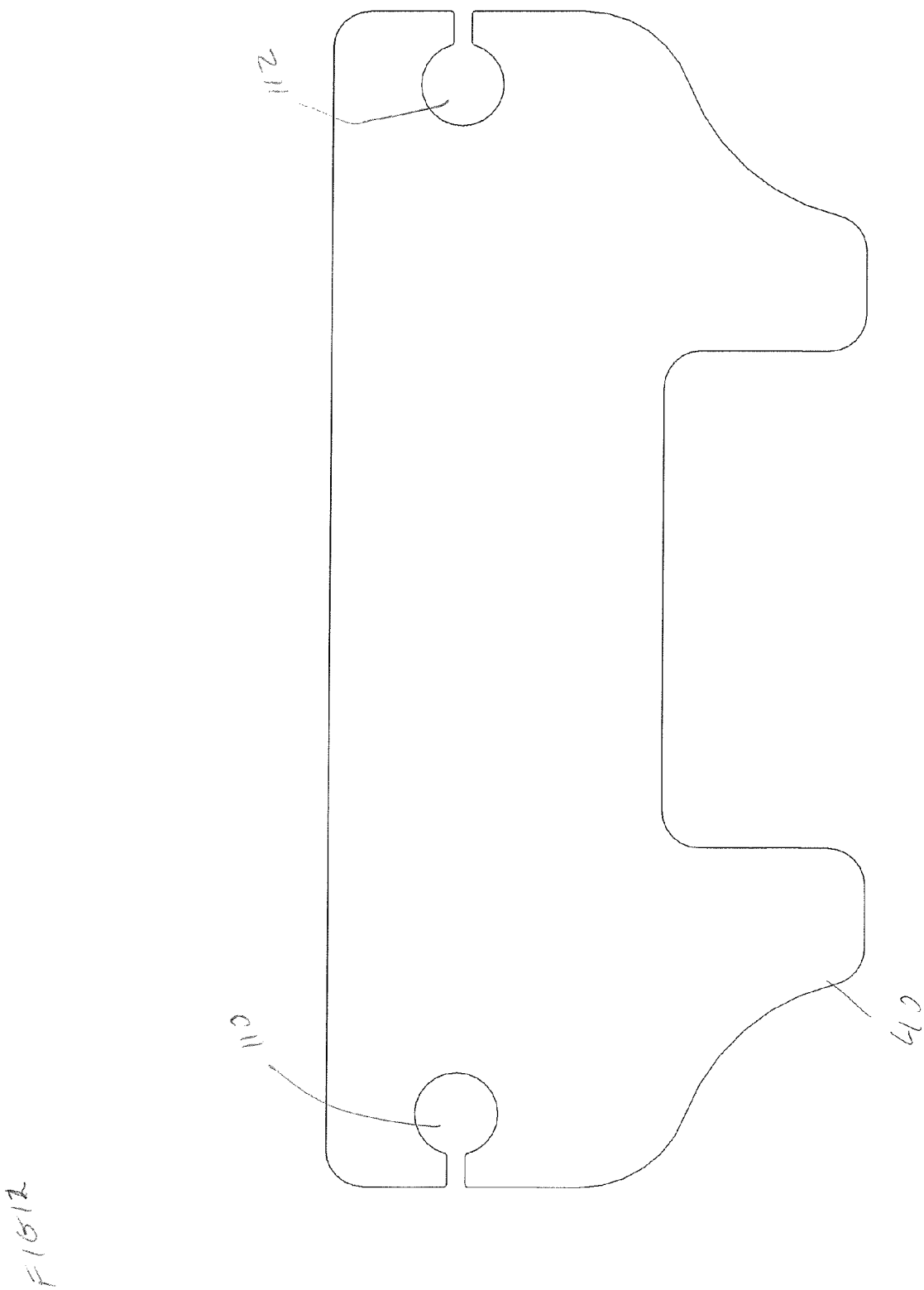

SUPPORT BED ASSEMBLY FOR CONVEYOR BELTS AND SLIDER BARS THEREFOR

FIELD OF THE INVENTION

The invention relates to a slider bars used for supporting conveyor belts traveling thereover and, more particularly, to support bed assemblies utilizing such slider bars.

BACKGROUND OF THE INVENTION

Support bed assemblies consisting of only impact bars, support bed assemblies consisting of impact bars and center impact rollers, and support bed assemblies consisting of slider bars and conventional, center non-impact rollers are known. Generally, support bed assemblies with impact bars are used in the impact or loading zone of conveyor belt systems where material to be conveyed is deposited on the conveyor belt, whereas support bed assemblies with the slider bars and center rollers are best adapted for use downstream of the impact zone for supporting the conveyor belt as it travels downstream with the material to be conveyed already deposited thereon.

Conventional slider bars have an upper plastic layer that is bonded to a metal base for use in support bed assemblies which, as mentioned, are generally outside of the impact zone where belts are loaded with material to be conveyed. Typically the plastic is an ultra high molecular weight polyethylene (UHMW) material that is bonded to a base of aluminum material. Because the polyethylene layer has low friction characteristics for supporting the belt to slide thereover, it is also difficult to bond directly to the aluminum base. In this regard, the UHMW layer tends to undesirably delaminate even under relatively low loading conditions.

Another problem with standard slider bars as described above is that the bonding of the UHMW layer to the aluminum base is a relatively expensive undertaking. For bonding the UHMW layer to the aluminum base, a bonding layer of adhesive foam is used which needs to be carefully laid down on the base, cut to length and set in place between the UHMW layer and the base. As is apparent, such a process is manual labor intensive and thus very costly.

Another known slider bar is thicker than the conventional lower profile slider bars and utilizes a hard urethane material molded to a lower metallic insert. The harder urethane material in these thicker slider bars is not of a resilience that will sufficiently absorb impact forces in the impact zone. Because of the high cost of the urethane material and its thickness, these thicker slider bars are also very expensive.

U.S. Pat. Nos. 5,038,924 and 5,103,967 to Stoll both disclose impact saddles that utilize multiple polymeric segments slid directly onto a support frame in a transverse direction relative to the belt travel direction. For this purpose, the segments are each provided with a pair of T-shaped slots that extend transversely across the width of the segments. The segments are each received in sequence on a corresponding pair of T-shaped support members of the support frame that extend transversely across and below the belt. To achieve impact absorption, rubber pads extend continuously along the upper surface of the support members so that they are received in the slots of each of the segments received thereon.

Thus, when mounted to the support frame, the length of the segments will extend orthogonal to the length of the T-shaped support members, and the polymeric material of the segments will extend upstream beyond the T-shaped support members. As the belt travels on these segments, forces urging the segments downstream will only be resisted by the support members creating a location for potential failure and requiring extra polymeric material upstream of the support members to minimize instances of such failure. In addition, Stoll discloses that the segments can be replaced by driving new segments onto the support frame from one side while the older segments come off the other side. However, this does not allow for efficient replacement of segments that may be more worn than others such as those located at the central area of the support frame where impact forces tend to be more heavily concentrated.

In the support bed assemblies best adapted for use in the impact zone, impact bars are utilized which are operable to absorb the impact forces generated by the heavy loads deposited onto the conveyor belt as it travels through the impact zone. For this purpose, in addition to including an upper plastic layer on which the belt is supported for sliding thereover, the impact bars include a body of elastomeric material bonded to the upper plastic layer. Thus, typical impact bars are thicker than low profile slider bars and even more expensive. Such support or impact bed assemblies and the construction of the impact bars therefor are described in Applicant's assignee's U.S. Pat. No. 7,815,040, which is incorporated as if reproduced in its entirety herein. The manufacture of the impact bars is relatively expensive since the elastomeric material itself can be relatively costly, and it is molded with a lower aluminum insert on which a bonding layer may be applied. An upper UHMW layer is utilized as in slider bars, and this layer may need to have its underside roughened and then have adhesive applied thereto for bonding the UHMW polyethylene layer to the upper surface of the elastomeric body. Thus, material costs, manual labor, and the manufacturing process make impact bars relatively expensive to produce.

SUMMARY OF THE INVENTION

In one aspect of the present invention, a slider bar assembly for supporting a conveyor belt traveling in a downstream travel direction is provided with the slider bar assembly including an elongate upper slide member of low friction material, and an elongate lower base member configured for being secured to support structure under the belt so that the elongate base member extends longitudinally in the downstream travel direction. A receptacle in one of the elongate upper slide member and the elongate lower base member, and a projection of the other of the elongate upper slide member and the elongate lower base member configured to have a sliding fit in the receptacle are provided. The sliding fit of the projection and receptacle removably connects the elongate upper slide member and the elongate lower base member so that the elongate upper slide member extends longitudinally along the elongate lower base member to be supported thereby. The removable connection provided by the sliding fit simplifies the manufacture of the slider bar assembly herein, thus lowering its cost in comparison to prior, conventional slider bars which have their upper plastic layer bonded to a metal base.

In one form, the elongate upper slide member and the elongate lower base member each have a predetermined lateral width transverse to the downstream travel direction that is substantially the same as each other. In this manner, excessive material of the upper slide member beyond either side of the elongate lower base member is avoided minimizing material cost therefor.

In another form, the removably connected elongate upper slide member and elongate lower base member have a combined predetermined thickness, and the projection and receptacle sliding fit together are disposed approximately midway along the combined predetermined thickness of the removably connected elongate upper slide member and elongate lower base member.

In yet another form, the elongate upper slide member is of a hard plastic material and the elongate lower base member is of an aluminum material. This allows the elongate base member to be formed by a relatively low cost extrusion process.

In a preferred form, the receptacle is an upper receptacle in the elongate lower base member, and the elongate lower base member is extruded to have a ribbed construction including a plurality of rib walls that cooperate to form elongate openings including the upper receptacle in the elongate lower base member. Preferably, the elongate openings including the upper receptacle comprise a pair of laterally spaced, elongate upper receptacles, and the projection of the elongate upper slide member includes a pair of laterally spaced depending projections configured to have a mating fit in the corresponding elongate receptacles that keeps the elongate upper slide member from separating from the elongate lower base member in directions transverse to the sliding fit therebetween.

In another form of the invention, a support bed assembly for fitting under and supporting a conveyor belt traveling in a downstream travel direction is provided. The support bed assembly includes a plurality of substantially rigid support structures for extending below and laterally across the conveyor belt and being spaced longitudinally from each other in a downstream travel direction. At least one elongate slider bar assembly is provided for being supported by the substantially rigid support structures to extend transversely thereacross in the downstream travel direction in engagement with the belt traveling thereover. The elongate slider bar assembly has a two-piece body including an upper slide member of low friction material for engaging the belt and a lower base member of metallic material for being secured to the support structures. A slide fit connection between the upper slide member and the lower base member is configured for connecting the upper slide member and the lower base member by longitudinally sliding the upper slide member and the lower base member relative to each other.

In one form, the support bed assembly includes a pair of laterally outer elongate slider bar assemblies for being disposed under outer side areas of the conveyor belt, and a plurality of elongate resilient impact bars each having a resilient body for absorbing impact forces on the belt and a lower metallic insert for mounting the impact bars to the support structures to extend parallel to and laterally inwardly from the laterally outer elongate slider bar assemblies under a central area of the conveyor belt with the support structures configured so that at least laterally outermost slider bar assemblies are inclined toward the central area of the conveyor belt. In this manner, the support bed assembly can include the lower cost slider bar assemblies under areas of the conveyor belt that do not see significant impact loads, whereas the impact bars are located in the central area of the conveyor belt at which impact loading on the conveyor belt is greatest when the support bed assembly is disposed in the impact zone of the conveyor belt system.

In another aspect of the invention, a method of assembling a support bed assembly for fitting under a conveyor belt is provided including securing a plurality of generally rigid support structures to extend below and laterally across the conveyor belt, arranging mounting slots of the generally rigid support structures to extend in a belt travel direction longitudinally along the lengths thereof so that open ends of the slots face upstream, sliding an elongate, upper slide member longitudinally relative to and along an elongate lower base member for longitudinally interfitting mating portions of the elongate, upper slide member and the elongate, lower base member along the lengths thereof, and securing fasteners depending from the elongate, lower base member longitudinally spaced along the length thereof in longitudinally aligned ones of the slots of the rigid support structures so that the elongate, lower base member and the elongate, upper slide member extend longitudinally in the belt travel direction along the lengths thereof.

BRIEF DESCRIPTION OF THE DRAWINGS

FIG. 9 is an end elevation view of the elongate upper slide member of FIG. 8 showing an inverted T-shaped configuration of the laterally spaced, depending elongate projections;

FIG. 10 is a perspective view of the elongate lower base member showing the extruded, ribbed construction thereof;

FIG. 11 is an end elevation view of the elongate lower base member of FIG. 10 showing rib walls forming elongate openings including the laterally spaced, elongate upper receptacles and upper rail portions for sliding of the elongate upper slide member thereon;

FIG. 12 is an end elevation view of one of the end retainer plates.

DETAILED DESCRIPTION OF THE PREFERRED EMBODIMENTS

Figure 1:
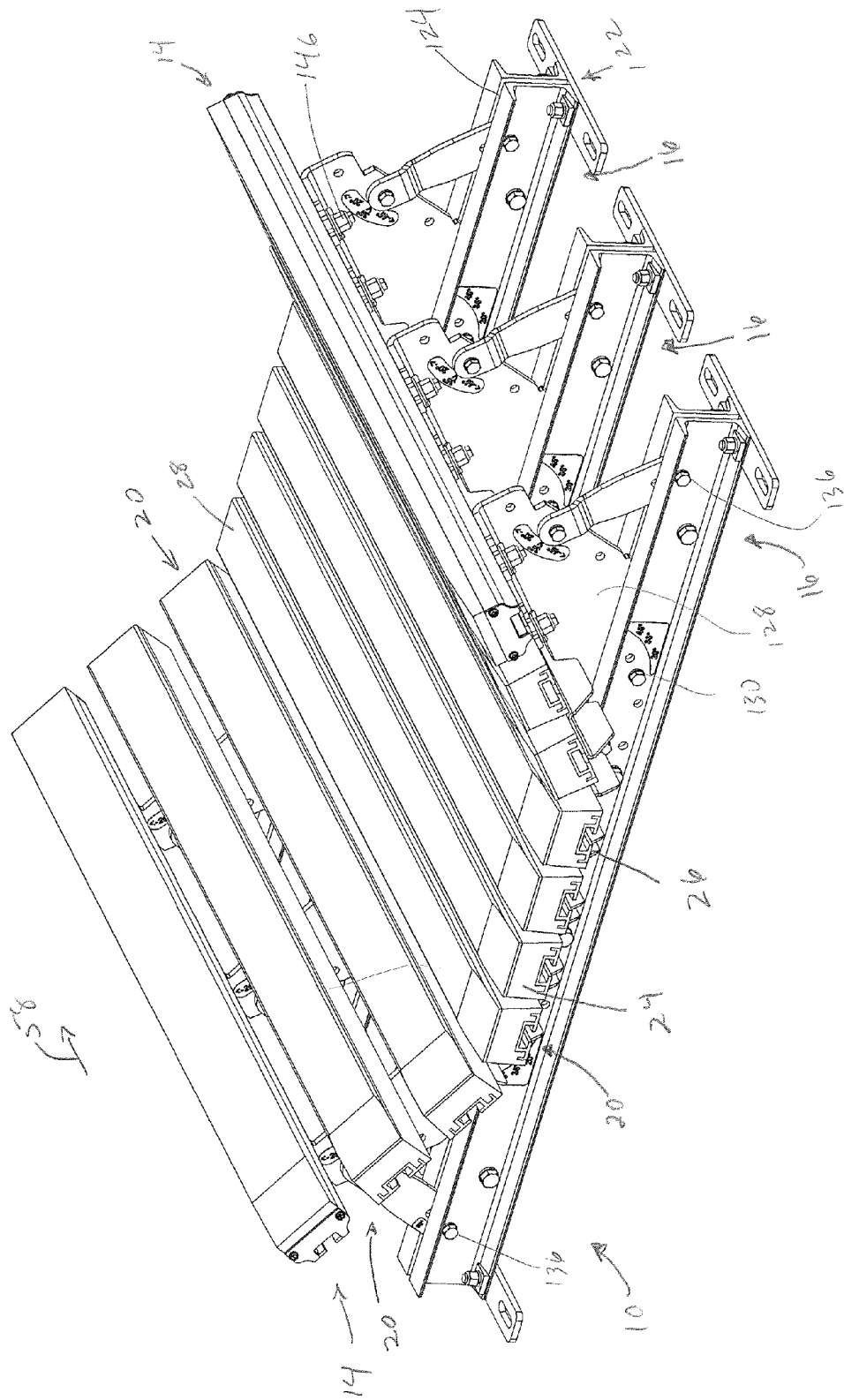
FIG. 1 is a perspective view of a support bed assembly including slider bars in accordance with the present invention showing the slider bars being at laterally outermost locations of the support bed assembly and impact bars laterally inward therefrom.
Figure 2:
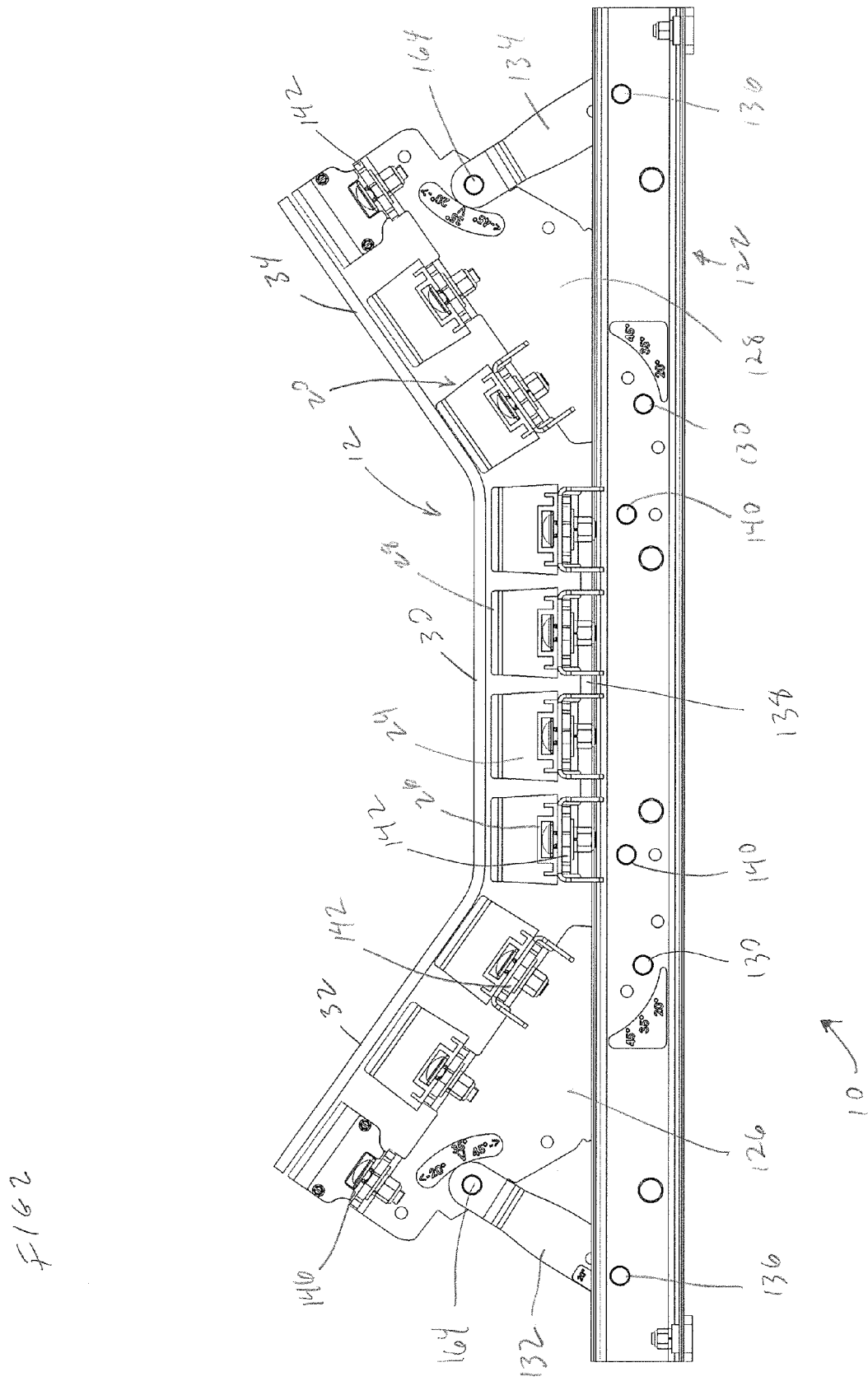
FIG. 2 is an end elevation view of the support bed assembly of FIG. 1 showing the laterally outermost slider bars and impact bars laterally inwardly of the laterally outermost slider bars under both of the side inclined portions of the troughed belt and impact bars under the central, lower portion of the belt.
Figure 3:
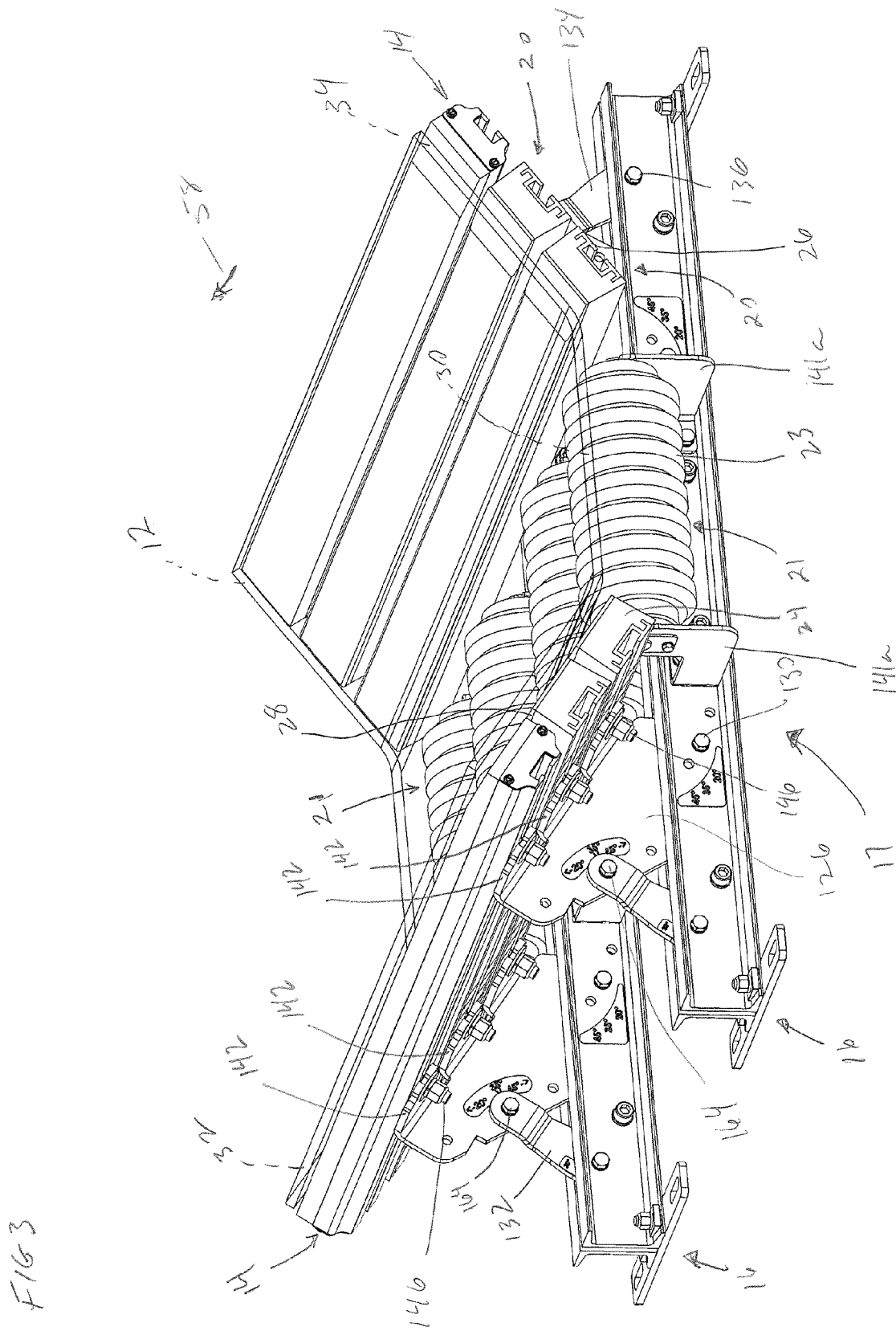
FIG. 3 is a perspective view of another support bed assembly including slider bars in accordance with the present invention showing laterally outermost slider bars and impact bars under both of the side inclined portions of the troughed belt and impact rollers under the central, lower portion of the belt.
Figure 4:
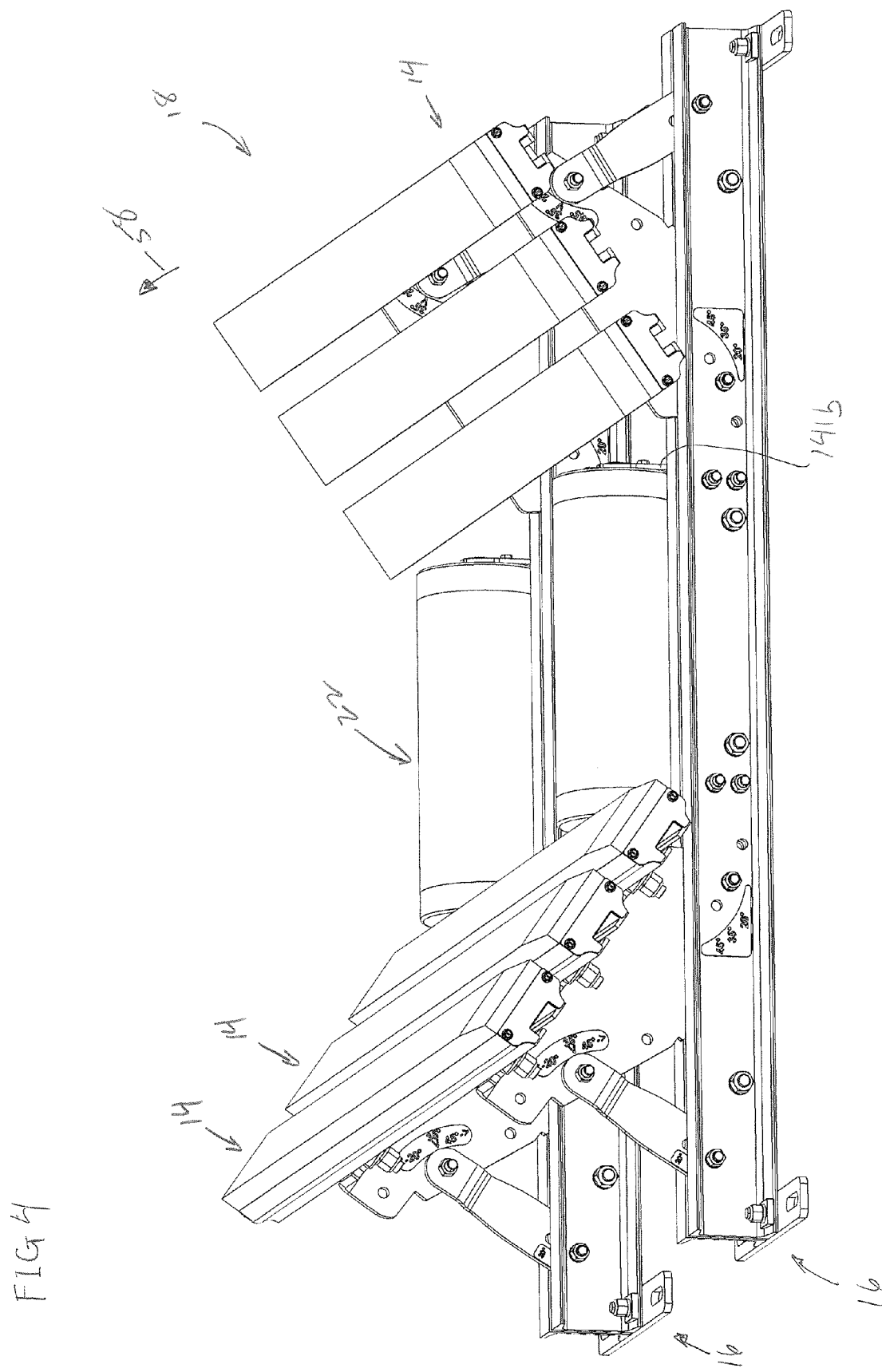
FIG. 4 is a perspective view of another support bed assembly including slider bars in accordance with the present invention showing multiple slider bars under each side inclined portion of the conveyor belt and conventional rollers under the central, lower portion of the conveyor belt.

In FIGS. 1 and 2, a support bed assembly 10 for supporting a conveyor belt 12 in an impact zone of a conveyor belt system where material to be conveyed is deposited on the belt 12 is illustrated. The support bed assembly 10 includes slider bars or slider bar assemblies 14 secured to support structures 16 of the support bed assembly 10. Similarly, FIG. 3 shows a support bed assembly 17 including slider bar assemblies 14 secured to support structures 16 of the support bed assembly 17. FIG. 4 is directed to another support bed assembly 18 that also includes slider bar assemblies 14 secured to support structures 16 but is adapted to be most effectively used downstream from the impact zone of the conveyor belt system. In this regard, the support bed assembly 10 is adapted for use in the impact zone by including impact bars 20 also secured to the support structure 16 laterally inwardly from the slider bar assemblies 14. Similarly, the support bed assembly 17 is adapted for use in the impact zone by including both impact bars 20 and center impact rollers 21 laterally inwardly from the slider bar assemblies 14. On the other hand, the support bed assembly 18 does not use impact bars and instead uses a combination of slider bar assemblies 14 and conventional center rollers 22 for providing support to the load carried by the belt 12 outside of the impact zone. The center impact rollers 21 absorb impact force by the use of multiple rubber rings 23 that extend around the rollers 21, whereas the center rollers 22 can be formed as conventional nylon rollers 22 that do not include such resilient rings 23.

The impact bars 20 are of known construction and are described in Applicant's assignee's incorporated U.S. Pat. No. 7,815,040. Generally, the impact bars 20 each have an elongate resilient body 24 of elastomeric material, such as a resilient rubber material, with a lower metallic insert 26 molded thereto and an elongate upper slide member bonded to the body 24 to extend along the top thereof, as shown in FIGS. 1-3. The upper slide member 28 is typically of a low friction, hard plastic material for slidingly engaging the underside of the conveyor belt 12. In these standard impact bars 20, there is a predetermined thickness from the bottom of the resilient body 24 and insert 26 to the top of the upper slide member 28 that is generally greater than that of standard lower profile slider bars that have an upper slider member bonded to a lower, metallic base member. In this regard, these slider bars were not used in combination with impact bars in prior support bed assemblies. Herein, the slider bar assemblies 14 are configured with a thickness that is substantially the same as that of the impact bars 20 while actually reducing the cost for the slider bar assemblies 14. This allows the slider bar assemblies 14 to be used in the support bed assembly 10 in conjunction with the impact bars 20 to provide both performance and cost advantages over prior support bed assemblies exclusively using impact bars.

Continuing reference to FIGS. 1 and 2, it can be seen that the support structures 16 of the support or impact bed assembly 10 are configured to support a conveyor belt 12 having a troughed configuration so that the laterally outermost slider bar assemblies 14 and a pair of impact bars 20 on either side of the impact bed assembly 10 are arranged at an incline relative to and toward the central impact bars 20 arranged horizontally at a recessed position relative to the laterally outer impact bars 20 and slider bar assemblies 14. In this manner, the impact bed assembly 10 has the central impact bars 20 arranged under a central lower area 30 of the conveyor belt 12 whereas the laterally outer inclined impact bars 20 and slider bar assemblies 14 are arranged under opposite inclined portions 32 and 34 of the conveyor belt 12. Similarly, referencing FIG. 3, the impact bed assembly 17 has the laterally outermost slider bar assemblies 14 and a pair of impact bars 20 on either side of the impact bed assembly 17 arranged at an incline toward the center impact rollers 23 that extend laterally and horizontally at a recessed position under the central, lower, recessed area 30 of the conveyor belt with the slider bar assemblies 14 and impact bars 20 under the belt side inclined portions 32 and 34.

By having the impact bars 20 laterally inwardly from the laterally outermost slider bar assemblies 14, the impact bed assembly 10 has the impact bars 20 disposed at locations of the conveyor belt 12 that are most likely to receive high impact forces from material being deposited thereon in the impact zone. This is also true for the impact bed assembly 17 where the impact bars 20 and center impact rollers 23 are laterally inwardly of the laterally outermost slider bar assemblies 14. On the other hand, at the laterally outermost sides of the belt 12, impact absorption is not as important since impact forces are less likely to be directed in this area of the belt 12. However, the slider bar assemblies have a generally rigid construction in contrast to the more resilient construction of the impact bars 20 such that they are operable to provide a better seal with rubber skirting material resiliently engaged on the laterally outer sides of the belt. The rubber skirting is typically mounted to the chute side walls in the impact zone where material is loaded onto the conveyor belt 12 so as to minimize spillage during conveyor belt loading operations. Thus, not only does the use of the more rigid, laterally outermost slider bar assemblies 14 in the impact bed assemblies 10 and 17 lower cost for the impact bed assemblies 10 and 17, they also can provide for improved spill control in the impact area.

The support bed assembly 18 shown in FIG. 4 is configured for use downstream of the impact area of the conveyor belt system and thus downstream of the impact bed assembly 10. Instead of impact bars 20 or impact rollers 23, the support bed assembly 18 utilizes both slider bar assemblies 14 and conventional center rollers 22 that are not adapted for impact absorption. Although these types of support bed assemblies 18 have been utilized, none employed the lower cost slider bar assemblies 14 herein. Further, the slider bar assemblies 14 in each of the support bed assemblies 10, 17 and 18 are constructed so that their wear part is replaceable unlike prior slider bars that had the upper plastic layer bonded to the metallic base, as has been previously described.

More particularly and referencing FIGS. 5-12, the slider bar assembly 14 has a two-piece body 35 (FIG. 6) including an elongate upper slide member 36 and an elongate lower base member 38 that are provided with a sliding fit therebetween so that the elongate upper slide member 36 is removably connected to the elongate lower base member 38. To removably connect the upper slide member 36 on the lower base member 38, end retainers in the form of plates 40 are removably secured to either end of the slider bar assemblies 14. The end retainer plate 40 can be secured to the lower base member 38 by fasteners 42 as shown at the upstream end 44 of the slider bar assembly 14 in FIG. 5 with the other opposite end retainer plate 40 being secured in the same manner to the downstream end 45 of the lower base member 38.

As mentioned above, the upper slide member 36 is a wear part as its upper surface 43 engages the underside of the belt 12 with the belt 12 traveling thereover. Thus, the upper slide member 36 is preferably of a low-friction, hard plastic material, such as of a UHMW polyethylene material. The upper surface 43 can include a lead-in tapered end portion 43a at the upstream end 44. To replace a worn upper slide member 36, either the illustrated end retainer plate 40 at the upstream end 44 of the slider bar assembly 14 is removed or the downstream end retainer plate 40 is removed to allow the worn upper slide member 36 to be slid off from the lower base member 38 for being replaced with a replacement upper slide member 36.

To achieve the increased thickness for the slider bar assembly 14 while still maintaining its cost advantages, the lower base member 38 is provided with an increased size or height dimension $h_1$, from its bottom to the top thereof (see FIG. 11). While this may require an increase in the material over lower height bases of the prior slider bars, the lower base member 38 is preferably extruded to have a ribbed construction so as to include rib walls or wall portions that cooperate to form various elongate openings in the lower base member 38 to lower the amount of material used therefor. In practice, the lower base member 38 is of an extruded aluminum material although it will be recognized other materials could also be employed for this purpose.

More specifically, the rib walls cooperate to form at least one, and preferably a pair of laterally spaced, upper elongate receptacles 46 and 48 configured for receiving at least one and preferably a pair of laterally spaced, depending elongate projections 50 and 52 of the upper slide member 36. Manifestly, the receptacles could be formed in the upper slide member 36 and the projections could be formed on the lower base member 38. In addition, the rib walls also form a central upper elongate opening 54 disposed between the receptacles 46 and 48 for receiving a central depending locator projection 56 of the slide member 36 which is disposed between the projections 50 and 52 thereof.

Figure 7:
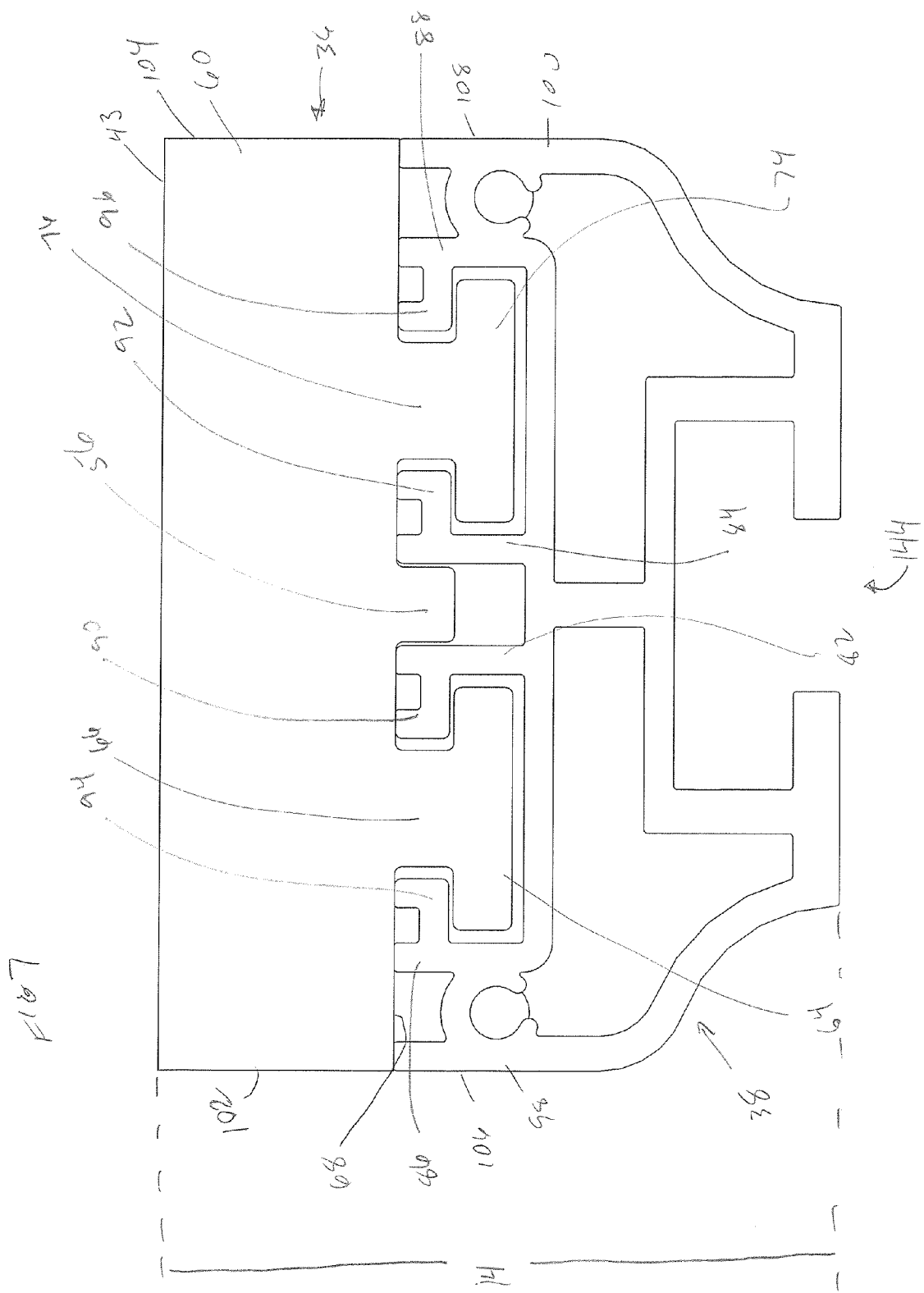
FIG. 7 is an end elevation view of the slider bar of FIG. 6 showing a pair of laterally spaced, depending elongate projections of the slider bar member received by the slide fit connection in corresponding laterally spaced, elongate upper receptacles of the lower base member.
Figure 8:
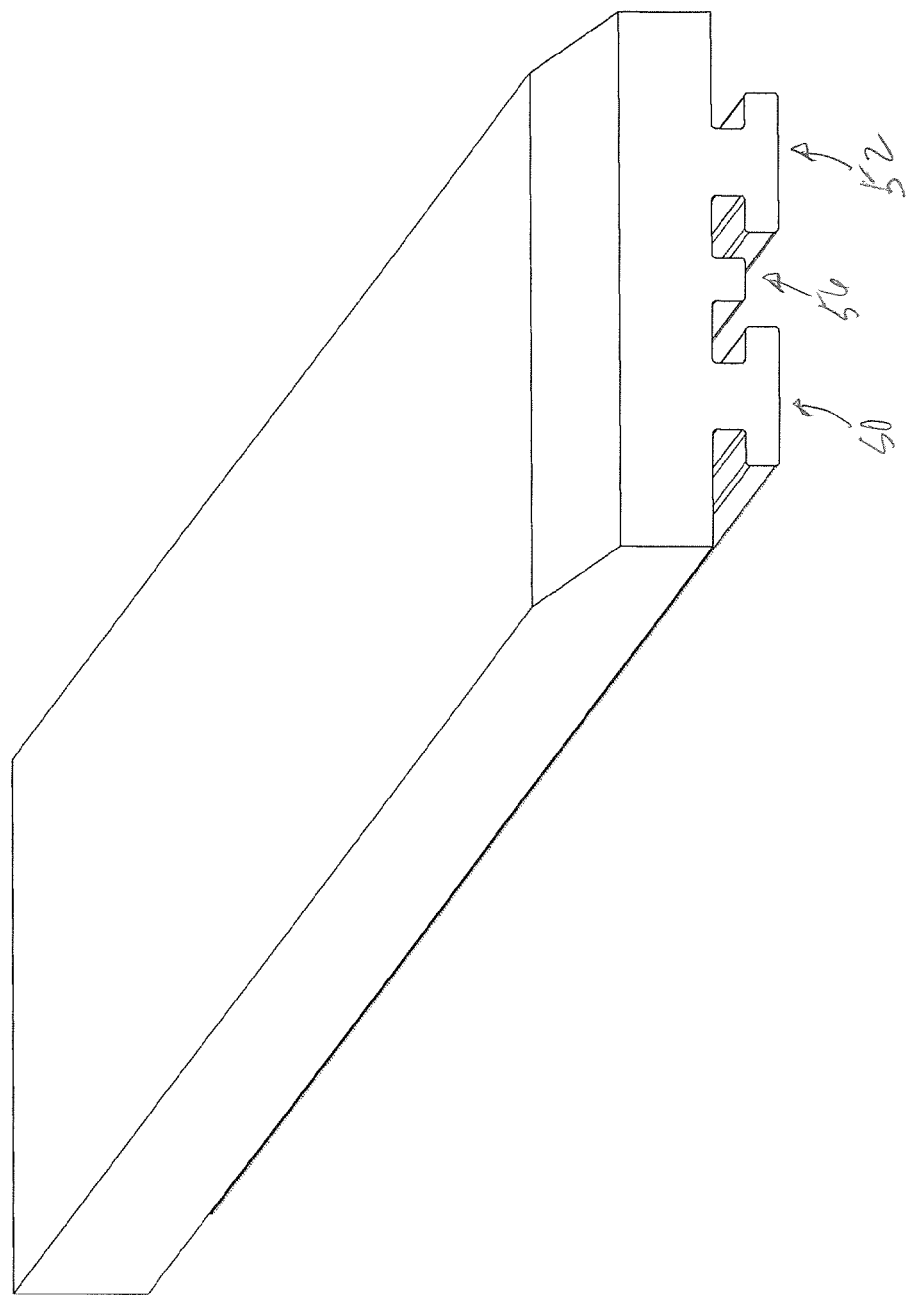
FIG. 8 is a perspective view of the elongate upper slide member showing the laterally spaced, depending elongate projections and a central, depending elongate locator projection therebetween.
Figure 90:
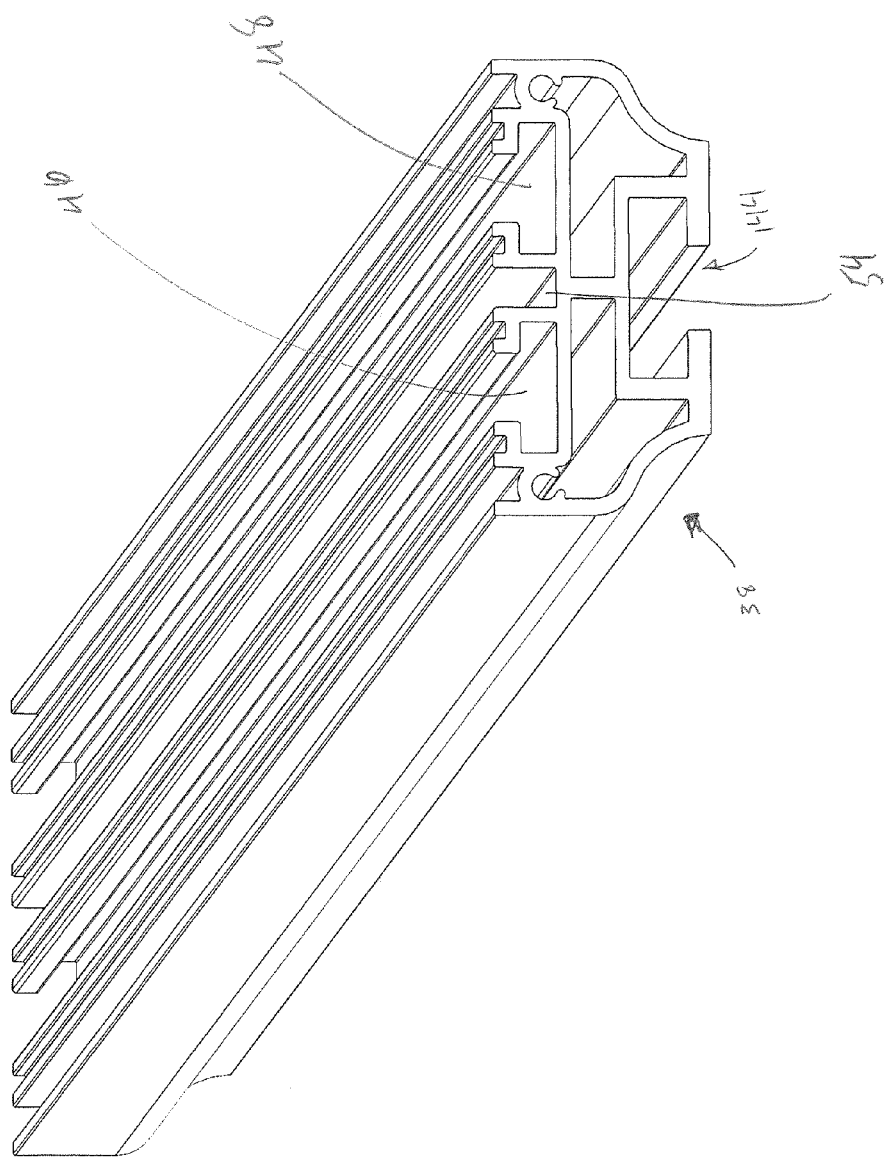

Referring to FIG. 7, it can be seen that the locator projection 56 is provided with a tighter lateral fit in the central opening 54 than the lateral fit between the projections 50 and 52 in the upper receptacles 46 and 48. In this manner, once the locator projection 56 is received in the central opening 54, the projections 50 and 52 will be properly laterally aligned in the receptacles 46 and 48 for being readily slid therealong with lateral clearance from the adjacent rib walls of the lower base member 38. More specifically, it can be seen that the elongate receptacles 46 and 48 and the elongate projections 50 and 52 are configured to have a mating fit to keep the elongate upper slide member 36 from separating from the elongate lower base member 38 in directions transverse to the longitudinal direction 58 which corresponds to both the direction of the slide fit between the upper slide member 36 and lower base member 38 and the direction of belt travel over the support bed assemblies 10 and 18. As shown, the receptacles 46 and 48 and the projections 50 and 52 each generally have an inverted T-shaped configuration for this purpose. This creates pocket openings on either side of each of the projections 50 and 52 for receiving rib walls of the lower base member 38 which serve as rail portions to support and slidingly engage the upper slide member 36, and specifically the main body portion 60 thereof as the slide member 36 is slidingly fit onto the lower base member 38.

Referring to FIG. 9, the projection 50 includes a laterally outer pocket opening 62 between the lower, laterally enlarged foot portion 64 and central, narrower neck portion 66 of the projection 50, and lower surface 68 of the main body portion 60. The projection 50 also has a laterally inward pocket opening 70 formed between the foot portion 64 and neck portion 66 of the projection 50, the main body lower surface 68, and the central locator projection 56. Similarly, the projection 52 includes a laterally outer pocket 72 formed between lower, laterally enlarged foot portion 74 and central, narrower neck portion 76 of the projection 52, and the lower surface 68 of the main body portion 60. Likewise, the projection 52 has a laterally inward pocket opening 78 formed between the foot portion 74 and neck portion 76 of the projection 52, lower surface 68 of the main body portion 60 and the central locator projection 56.

Referring to FIG. 11, the rib walls of the extruded lower base member 38 include an intermediate horizontal rib wall 80 that extends along the bottom of each of the receptacles 46 and 48. A pair of generally central upstanding vertical walls 82 and 84 extend upwardly from the rib wall 80 to form the laterally inner sides of lower, laterally enlarged portions 46a and 48a of the receptacles 46 and 48, respectively. Laterally outer, upstanding vertical rib walls 86 and 88 extend upwardly from either end of the horizontal rib wall 80 to form the laterally outer sides of the receptacle portions 46a and 48a, respectively. The central rib vertical walls 82 and 84 each include a generally L-shaped extension rib wall 90 and 92, respectively, that projects laterally outward therefrom just below their upper ends and fits into the laterally inward pockets 70 and 78 when the slide member 36 is slidingly fit onto the lower base member 38. Similarly, the outer vertical rib walls 86 and 88 have generally L-shaped extension rib walls 94 and 96, respectively, extending laterally inward therefrom just below their upper ends to fit into the respective laterally outer pocket openings 62 and 72 when the upper slide member 36 is slidingly fit onto the lower base member 38. The extension rib walls 90 and 94 cooperate to form the narrow neck portion 46b of the receptacle 46, and the extension rib walls 92 and 96 cooperate to form the narrow neck portion 48b of the receptacle 48. The upper slide member 36 can have its lower surface 68 slide on the rail portions of the lower base member 38 formed by the horizontally aligned upper ends of the rib walls 82-96 of the lower base member 38 when being slidingly received thereon. In addition, the lower base member 38 has outer side generally vertical rib walls 98 and 100 that also at their horizontally aligned upper ends slidingly engage the main body portion lower surface 68 to support the lower base member 38 thereon.

Returning to FIG. 7, as previously discussed, the central locator projection 56 has a tighter lateral fit in the central opening 54 than do the projections 50 and 52 in their respective receptacles 46 and 48. In this regard, it can be seen that either side of the locator projection 56 is laterally closer to the adjacent vertical rib walls 82 and 84 in comparison to the larger lateral clearance the projections 50 and 52 have. As can be seen, the projection foot portion 64 has a relatively enlarged lateral spacing between the adjacent vertical rib walls 82 and 86, and the neck portion 66 has a relatively enlarged lateral spacing between the L-shaped rib walls 90 and 94 when compared to the tighter lateral spacing of the central locator projection 56 between the rib walls 82 and 84. Similarly, the foot portion 74 of the projection 52 has a relatively enlarged laterally spacing from the adjacent vertical rib walls 84 and 88, and the projection neck portion 76 has a relatively enlarged lateral spacing from the adjacent L-shaped extension rib walls 92 and 96 when compared to the tighter lateral spacing of the central locator projection 56 between the rib walls 82 and 84. Thus, the central locator projection 56 provides the lateral alignment of the upper slide member 36 on the lower base member 38 while the projections 50 and 52 keep the upper slide member 36 secured to the lower base member 38 when slidingly received thereon. Further, it can be seen that since the central locator projection 56 is only used to provide the lateral fit, it need not project as down far away from the lower surface 68 of the upper slide member main body 60 as do the projections 50 and 52. Since the upper slide member 36 and the lower base member 38 are formed to have the same lateral width, it can be seen that with the locator projection 56 tightly received in the lower base member opening 54 therefor, opposite outer sides 102 and 104 will be aligned and generally flush with upper, outer side surface portions 106 and 108 of the vertical rib walls 98 and 100 of the lower base member 38. In practice, the lateral width between the outer sides 102 and 104 can be approximately 4 inches, and the lateral width between the upper, outer side surface portions 106 and 108 can be approximately 4 inches.

As previously mentioned, the slider bar assembly 14 herein is provided with a two-piece body 35 that includes the upper slide member 36 and lower base member 38 that is of substantially the same combined thickness as the prior thicker impact bars 20. In this regard, the height dimension or thickness of the standard impact bars 20 from the bottom of the resilient body 24 to the top of the upper slide member 28 is approximately 3 inches, and thus the two-piece body 35 is likewise provided with a height dimension H that preferably is approximately the same as the standard impact bar 20. As also previously mentioned, the lower base member 38 is provided with an increased height dimension $h_1$ for this purpose which is preferably approximately 2 inches from the bottom to the top thereof. On the other hand, the thickness or height dimension $h_2$ of the main body portion 60 of the upper slide member 36 remains the same of that of the corresponding upper slide member in prior low profile slider bars. In this regard, the height $h_2$ of the main body portion 60 is preferably approximately 1 inch. Thus, with the projections 50, 52 and 56 of the upper slide member 36 received in the corresponding receptacles 46, 48 and 54 of the lower base member 38 so that the main body portion lower surface 68 is supported on the upper ends of the rib walls 82-100, the total height H of the two-piece body 35 of the slider bar assembly 14 will equal $h_1$ plus $h_2$, which preferably is approximately 3 inches, to be substantially the same as the standard 3 inch height impact bars 20. This allows the slider bar assemblies 14 and impact bars 20 to be used in the same support bed assembly such as the support bed assemblies 10, 17 and 18 depicted herein.

While the support interface formed between the main body portion lower surface 68 and the upper ends of the rib walls 82-100 is at approximately two-thirds of the combined height H of the two-piece body 35 of the slider bar assemblies 14, the projections 50, 52, and 56 project downwardly into the receptacles 46, 48 and 54 so as to overlap in the vertical direction with the height $h_1$ of the lower base member 38. In this regard, the slide fit provided by the projections 50, 52 and 56 in their receptacles 46, 48 and 54 is approximately midway along the combined predetermined thickness or height H of the two-piece body 35. More particularly, the vertically longer projections 50 and 52 preferably extend approximately 0.5 inch downwardly from the main body portion lower surface 68, whereas the shorter central locater projection 56 extends downwardly from the main body portion lower surface 68 preferably approximately 0.25 inch, and approximately the same length as that of the neck portions 66 and 76 of the inverted T-shaped projections 50 and 52. Thus, the projections 50 and 52 received in their receptacles 46 and 48 will be at approximately midway along the height H or combined thickness of the upper slide member 36 and lower base member 38.

Figure 5:
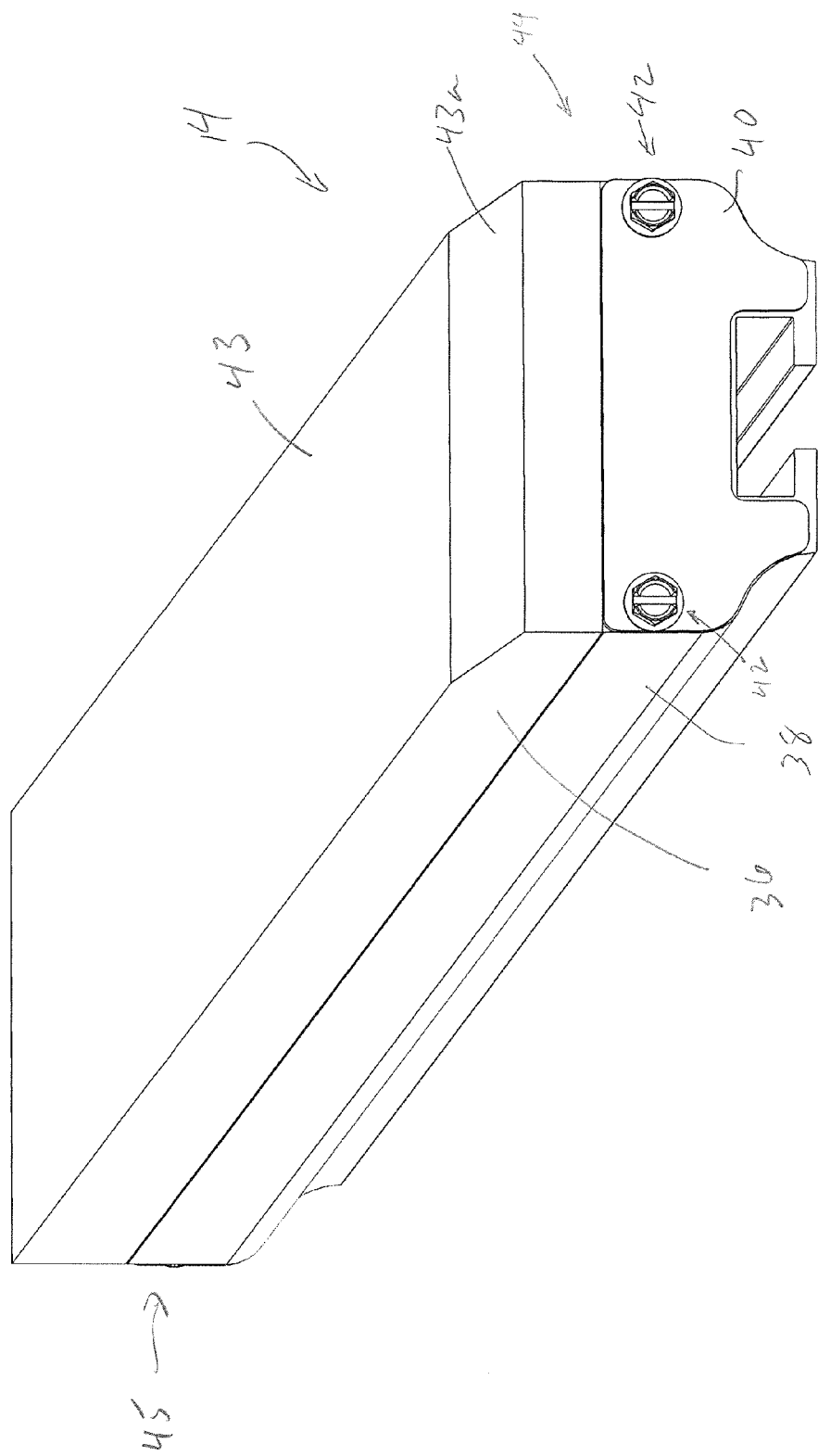
FIG. 5 is a perspective view of the slider bar used in the support bed assemblies of FIGS. 1-4 showing an elongate upper slide member removably retained on an elongate lower base member by end retainer plates, one of which is illustrated.
Figure 6:
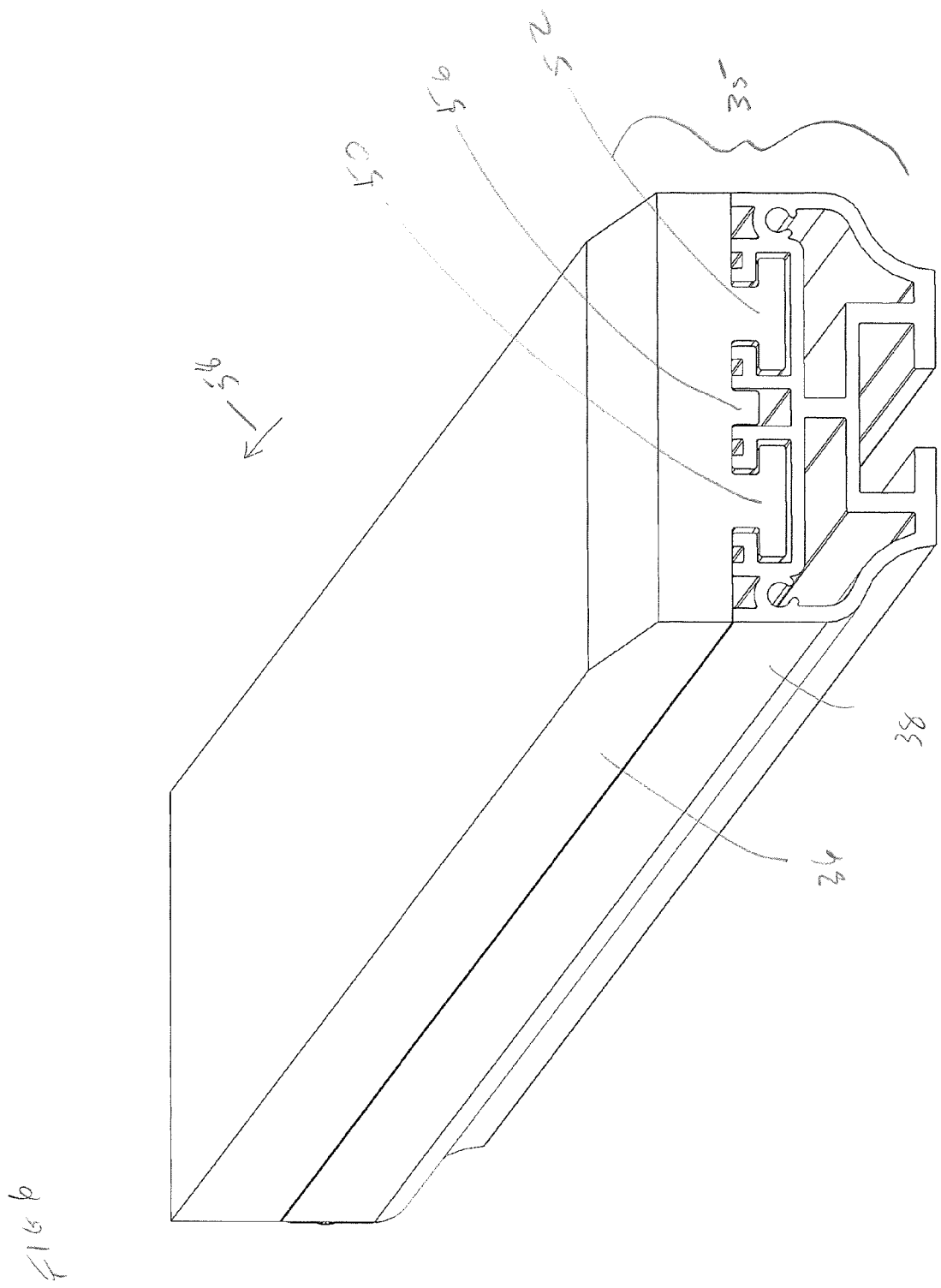
FIG. 6 is a perspective view of the slider bar with the upstream end retainer plate thereof removed to show the two-piece body of the slider bar including the elongate upper slide member and the elongate lower base member connected by a slide fit connection therebetween.

Referring next to FIGS. 5, 11 and 12, the end retainer plate 40 is sized so that when secured to the slider bar assembly 14, and specifically the lower base member 38 thereof, the plate member 40 will be disposed in interference with sliding of the projections 50 and 52 in their receptacles 46 and 48 therefor. As shown, the end retainer plate 40 has a pair of upper, side apertures 110 and 112, and the lower base member 38 has corresponding upper, side arcuate rib portions 114 and 116 forming elongate arcuate channels 118 and 120, respectively. The spacing of the side apertures 110 and 112 is such that they can be aligned with the arcuate channels 118 and 120 to allow the fasteners 42, which can be self tapping screws, to be screwed through the aligned aperture 110 and into the channel 118 and through aperture 112 and into the channel 120 for removably threadably securing the end retainer plates 40 to either end of the lower base member 38. As shown, the end retainer plate 40 secured by fasteners 42 to the lower base member 38 will cover the receptacles 46 and 48 and the projections 50 and 52 received therein, as well as the receptacle 54 and the projection 56 received therein. The retainer plate 40 can have a similar peripheral size and shape to that of either end of the lower base member 38. The upper slide member 36 is removable from the lower base member 38 by removing either one or both of the end retainer plates 40.

Returning to FIGS. 1-4, the support structures 16 each includes a cross member 122 that is sized to extend across and under the conveyor belt 12 for being secured to side conveyor frame structure on either side of the belt 12. Each support bed assembly includes multiple cross-members 122 spaced in the longitudinal belt travel direction 58 from each other. As illustrated, the cross-members 122 can be in the form of a pair of bolted together C-channels that each open laterally outward with their web walls closely adjacent one another. In this manner, the cross-members 122 each include a central slot 124 for receiving support members therein.

More specifically, for troughed belt configurations, the laterally outer support members 126 and 128 for the impact bed assemblies 10, 17 and 18 are pivotably secured in the slot 124 at their laterally inner end portions via pivot fasteners 130 that extend through apertures of the cross-member 122. Support arms 132 and 134 for the respective support members 126 and 128 are provided for raising the laterally outer end portions of the support members 126 and 128 so that the support members 126 and 128 are inclined toward one another as shown. The support arms 132 and 134 are pivotably secured to the cross-member 122 in the slot 124 at their lower ends via pivot fasteners 136 extending through aligned apertures of the cross-member 122.

In the impact bed assembly 10, a central, lower support member 138 is secured to each of the cross-members 122 by a pair of fasteners 140. Bracket members 141a fixed to the cross-members 122 support the center impact rollers 21 (FIG. 3) of impact bed assembly 17, and bracket members 141b fixed to the cross-members 122 support the center conventional rollers 22 (FIG. 4).

Each of the support members 126, 128 and 138 include integral, rigid mounting pads 142 (FIGS. 2 and 3) that are elongated to extend in the longitudinal direction 58 as described in applicant's assignees' incorporated U.S. Pat. No. 7,815,040. The mounting pads 142 are spaced along the support members so that the mounting pads 142 of the different support structures 16 are longitudinally aligned for supporting the slider bar assemblies 14, and the impact bars 20, extending transversely thereacross in the longitudinal belt travel direction 58.

The rib walls of the lower base member 38 cooperate to form a lower elongate opening 144 for receiving fasteners 146 that secure the slider bar assemblies 14 to the mounting pads 142, as seen best in the support bed assembly 17 of FIG. 3. The impact bars 20 can be secured to the mounting pads 142 in a similar fashion. Referring to FIG. 11, the lower opening 144 preferably is T-shaped and is formed by a lower, horizontal rib wall 148 that extends below and parallel to intermediate horizontal rib wall 80 and is connected thereto by central, intermediate vertical rib wall 150. The horizontal rib wall 148 has depending vertical rib walls 152 and 154 at either end thereof that extend to the bottom of the lower base member 38 where they are connected to bottom rib walls 156 and 158, respectively. The bottom rib walls 156 and 158 extend inwardly toward one another beyond the vertical rib walls 152 and 154 to form flange portions 160 and 162 thereof. Thus, the T-shaped opening 144 is formed by the lower horizontal rib wall 148, depending vertical rib walls 152 and 154, and flange portions 160 and 162. The flange portions 160 and 162 form a narrow neck opening portion 144*a* that opens to an enlarged upper portion 144*b* of the T-shaped opening 144. The fasteners 146 have their enlarged head portion fit in the opening upper portion 144*b* to be seated on the upper surfaces of the flange portions 160 and 162 with the shank depending through the opening neck portion 144*a* to extend downwardly out through the opening 144. The mounting pads 142 are each provided with a longitudinally extending slot extending along the length of the pads and opening to the upstream end so that the depending shank of the fasteners 144 can be fit therein to extend below the mounting pads 142 with a nut threaded thereon for securing the slider bar assemblies 14 thereto.

As has been discussed, the two-piece body 35 of the slider bar assemblies 14 herein allows for the wear part or upper slide member 36 to be replaced with a new, replacement upper slide member 36. And since the slider bar assemblies 14 are used on the pivotal, inclined support members 126 and 128, the upper slide members 36 thereof can be replaced while the support bed assemblies 10, 17 and 18 remain in service. For this purpose, the fasteners 164 connecting the support arms 132 and 134 to the respective lateral support members 126 and 128 are removed to allow the arms 132 and 134 to be pivoted about the pivot fasteners 136 outwardly and the lateral support members 126 and 128 to be pivoted about the pivot fasteners 130 downwardly away from the conveyor belt 12, and specifically the inclined side portions 32 and 34 thereof. At this time, either one or both of the retainer end plates 40 can be removed from the slider bar assembly 14 and the worn upper slide member 36 can be slid off the lower base member 38 for replacement thereof. Since each slider bar assembly 14 is independent from another slider bar assembly 14, it follows that the decision and operation relating to the removal of a worn slider member 36 of one of the slider bar assemblies 14 can occur independent of these considerations with respect to another slider bar assembly 14.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A slider bar assembly for supporting a conveyor belt traveling in a downstream travel direction, the slider bar assembly comprising:
    an elongate upper slide member of low friction material for engaging and supporting the belt as the belt travels thereover;
    an elongate lower base member configured for being secured to support structure under the belt so that the elongate lower base member extends longitudinally in the downstream travel direction;
    a receptacle in one of the elongate upper slide member and the elongate lower base member and a projection of the other of the elongate upper slide member and the elongate lower base member configured to have a sliding fit in the receptacle for removably connecting the elongate upper slide member and the elongate lower base member with the elongate upper slide member extending longitudinally along the elongate lower base member, wherein elongate upper slide member and the elongate lower base member each have a predetermined lateral width transverse to the downstream travel direction that is substantially the same as each other,
    wherein the upper slide member has laterally outer sides that are laterally spaced by the predetermined lateral width of the upper slide member and an upper surface extending continuously across the upper slide member for the full predetermined lateral width thereof for engaging and supporting the belt.

2. The slider bar assembly of claim 1 wherein the removably connected elongate upper slide member and elongate lower base member have a combined predetermined thickness, and the projection and receptacle sliding fit together are disposed approximately midway along the combined predetermined thickness of the removably connected elongate upper slide member and elongate lower base member.

3. The slider bar assembly of claim 1 wherein the elongate upper slide member is of a hard plastic material and the elongate lower base member is of an aluminum material.

4. The slider bar assembly of claim 1 wherein the receptacle is an upper receptacle in the elongate lower base member, and the elongate lower base member is extruded to have a ribbed construction including a plurality of rib walls that cooperate to form elongate openings including the upper receptacle in the elongate lower base member.

5. The slider bar assembly of claim 4 wherein the elongate openings including the upper receptacle comprise a pair of laterally spaced, upper elongate receptacles, and the projection of the elongate upper slide member comprises a pair of laterally spaced, depending elongate projections configured to have a mating fit in the corresponding elongate receptacles that keeps the elongate upper slide member from separating from the elongate lower base member in directions transverse to the sliding fit therebetween.

6. The slider bar assembly of claim 5 wherein the laterally spaced, upper elongate receptacles and the laterally spaced, depending elongate projections each generally have an inverted T-shaped configuration.

7. The slider bar assembly of claim 4 wherein the elongate openings include a lower receptacle for receiving fasteners for securing the elongate base member to support structure under the belt.

8. The slider bar assembly of claim 1 including longitudinal end plates configured to be removably secured to opposite longitudinal ends of the elongate lower base member in interference with sliding of the elongate upper slide member to keep the upper slide member removably connected to the lower base member.

9. A slider bar assembly for supporting a conveyor belt traveling in a downstream travel direction, the slider bar assembly comprising:
    an elongate upper slide member of low friction material for engaging and supporting the belt as the belt travels thereover;
    an elongate lower base member configured for being secured to support structure under the belt so that the elongate lower base member extends longitudinally in the downstream travel direction;
    a receptacle in one of the elongate upper slide member and the elongate lower base member and a projection of the other of the elongate upper slide member and the elongate lower base member configured to have a sliding fit in the receptacle for removably connecting the elongate upper slide member and the elongate lower base member with the elongate upper slide member extending longitudinally along the elongate lower base member, wherein elongate upper slide member and the elongate lower base member each have a predetermined lateral width transverse to the downstream travel direction that is substantially the same as each other, wherein the receptacle is an upper receptacle in the elongate lower base member, and the elongate lower base member is extruded to have a ribbed construction including a plurality of rib walls that cooperate to form elongate openings including the upper receptacle in the elongate lower base member, the elongate openings including the upper receptacle comprise a pair of laterally spaced, upper elongate receptacles, and the projection of the elongate upper slide member comprises a pair of laterally spaced, depending elongate projections configured to have a mating fit in the corresponding elongate receptacles that keeps the elongate upper slide member from separating from the elongate lower base member in directions transverse to the sliding fit therebetween, the elongate openings include a central upper elongate opening between the upper elongate receptacles, and the elongate upper slide member comprises a central depending locator projection between the laterally spaced, depending elongate projections that has a tighter lateral fit in the central upper elongate opening than the slide fit between the laterally spaced, depending elongate projections and the laterally spaced, upper elongate receptacles.

10. The slider bar assembly of claim 9 wherein the elongate upper slider member has a main body portion including an upper surface for engaging the belt and a lower surface supported on predetermined ones of the rib walls with the laterally spaced, depending elongate projections extending further downward from the main body portion lower surface than the central depending locator projection.

11. A support bed assembly for fitting under and supporting a conveyor belt traveling in a downstream travel direction, the support bed assembly comprising:
 a plurality of substantially rigid support structures for extending below and laterally across the conveyor belt and being spaced longitudinally from each other in the downstream travel direction;
 at least one elongate slider bar assembly for being supported by the substantially rigid support structures to extend transversely thereacross in the downstream travel direction in engagement with the belt traveling thereover;
 a two-piece body of the elongate slider bar assembly including an upper slide member of low-friction material for engaging the belt and a lower base member of metallic material for being secured to the support structures; and
 a slide fit connection between the upper slide member and the lower base member configured for connecting the upper slide member and the lower base member by longitudinally sliding the upper slide member and the lower base member relative to each other;
 wherein the slide fit connection comprises a depending projection of the upper slide member and an upper receptacle of the lower base member with the projection configured to have a mating fit in the upper receptacle to keep the upper slide member from separating from the lower base member in directions transverse to the longitudinal sliding therebetween, and the depending projection and the upper receptacle each have an inverted T-configuration with the depending projection having a lower, enlarged foot portion and the receptacle having a lower, enlarged portion sized to slidingly receive the lower enlarged foot portion therein, the lower, enlarged foot portion being located entirely in the receptacle lower, enlarged portion with the upper slide member completely slid onto the lower base member.

12. The support bed assembly of claim 11 wherein the two-piece body has a predetermined thickness, and the slide fit connection between the upper slide member and the lower base member is disposed approximately midway along the thickness of the two-piece body.

13. The support bed assembly of claim 11 wherein the depending projection and the upper receptacle comprise a pair of depending projections and a pair of upper receptacles, and
 a locator portion and an opening of the upper slide member and the lower base member with the locator portion fitting in the opening with the depending projections received in the upper receptacles to minimize lateral shifting between the upper slide member and the lower base member.

14. The support bed assembly of claim 11 wherein the at least one elongate slider bar assembly comprises at least a pair of laterally outer elongate slider bar assemblies for being disposed under outer side areas of the conveyor belt, and
 a central impact roller mounted to extend laterally across and under a central area of the conveyor belt laterally between the laterally outer elongate slider bar assemblies with the support structures configured so that the laterally outer elongate slider bar assemblies are inclined toward the central area of the conveyor belt.

15. The support bed assembly of claim 11 wherein the support structures each comprise a cross member extending below and laterally across the belt for being mounted to conveyor frame structure on either side of the belt, and a support member mounted on the cross member with the support members each having at least one mounting pad configured for having the lower base member secured thereto.

16. A support bed assembly for fitting under and supporting a conveyor belt traveling in a downstream travel direction, the support bed assembly comprising:
 a plurality of substantially rigid support structures for extending below and laterally across the conveyor belt and being spaced longitudinally from each other in the downstream travel direction;
 at least one elongate slider bar assembly for being supported by the substantially rigid support structures to extend transversely thereacross in the downstream travel direction in engagement with the belt traveling thereover;
 a two-piece body of the elongate slider bar assembly including an upper slide member of low-friction material for engaging the belt and a lower base member of metallic material for being secured to the support structures; and
 a slide fit connection between the upper slide member and the lower base member configured for connecting the upper slide member and the lower base member by longitudinally sliding the upper slide member and the lower base member relative to each other, wherein the at least one elongate slider bar assembly comprises at least a pair of laterally outer elongate slider bar assemblies for being disposed under outer side areas of the conveyor belt, and
 a plurality of elongate resilient impact bars each having a resilient body for absorbing impact forces on the belt and a lower metallic insert for mounting the impact bars to the support structures to extend parallel to and laterally inwardly from the laterally outer elongate slider bar assemblies under a central area of the conveyor belt with the support structures configured so that at least laterally outermost slider bar assemblies are inclined toward the central area of the conveyor belt.

17. The support bed assembly of claim 16 wherein the elongate slider bar assemblies and the elongate resilient impact bars each have a predetermined thickness that is substantially the same as each other for interchangeability of the elongate slider bar assemblies and elongate resilient impact bars.

18. A method of assembling a support bed assembly for fitting under a conveyor belt, the method comprising:
   securing a plurality of generally rigid support structures to extend below and laterally across the conveyor belt;
   arranging mounting slots of the generally rigid support structures to extend in a belt travel direction longitudinally along the lengths thereof so that open ends of the slots face upstream;
   sliding an elongate, upper slide member longitudinally relative to and along an elongate lower base member for longitudinally interfitting mating portions of the elongate, upper slide member and the elongate, lower base member along the lengths thereof; and
   securing fasteners depending from the elongate, lower base member longitudinally spaced along the length thereof in longitudinally aligned ones of the slots of the rigid support structures so that the elongate, lower base member and the elongate, upper slide member extend longitudinally in the belt travel direction along the lengths thereof.

19. A method of assembling a support bed assembly for fitting under a conveyor belt, the method comprising:
   securing a plurality of generally rigid support structures to extend below and laterally across the conveyor belt;
   arranging mounting slots of the generally rigid support structures to extend in a belt travel direction longitudinally along the lengths thereof so that open ends of the slots face upstream;
   sliding an elongate, upper slide member longitudinally relative to and along an elongate lower base member for longitudinally interfitting mating portions of the elongate, upper slide member and the elongate, lower base member along the lengths thereof; and
   securing fasteners depending from the elongate, lower base member longitudinally spaced along the length thereof in longitudinally aligned ones of the slots of the rigid support structures so that the elongate, lower base member and the elongate, upper slide member extend longitudinally in the belt travel direction along the lengths thereof,
   wherein sliding of the elongate, upper slide member relative to and along the elongate, lower base member occurs either before or after the fasteners are secured in the longitudinally aligned slots.

20. A support bed assembly for supporting a conveyor belt traveling in a downstream travel direction, the support bed assembly comprising:
   a plurality of generally rigid support structures for extending below and laterally across the conveyor belt and being spaced longitudinally from each other in the downstream travel direction;
   an elongate slider bar having a body of substantially rigid material and an upper surface of low friction material for engagement with the conveyor belt;
   an elongate impact bar having a body of resilient material and an upper surface of low friction material for engagement with the conveyor belt;
   a plurality of mounting portions of the support structures for mounting the slider bar and the impact bar thereon;
   a lower surface of the elongate impact bar received on the mounting portions with the elongate impact bar connected thereto, the elongate impact bar having a predetermined thickness between the lower and upper surfaces thereof; and
   a lower surface of the elongate slider bar received on the mounting portions with the elongate slider bar connected thereto, the elongate slider bar having a predetermined thickness between the lower and upper surfaces thereof substantially the same as the impact bar predetermined thickness so that the elongate slider bar and the elongate impact bar are interchangeable with one another.

21. The support bed assembly of claim 20 wherein the elongate slider bar comprises a pair of laterally outer elongate slider bars connected to the mounting portions to extend under outer side areas of the conveyor belt and the elongate impact bar comprises a plurality of elongate impact bars that extend substantially parallel to and laterally inwardly from the laterally outer elongate slider bars under a central area of the conveyor belt.

22. The support bed assembly of claim 21 wherein the support structures include laterally outer inclined portions including mounting portions thereof configured so that at least the laterally outer elongate slider bars connected to the mounting portions of the laterally outer inclined portions are inclined toward the central area of the conveyor belt.

23. A slider bar assembly for supporting a conveyor belt traveling in a downstream travel direction, the slider bar assembly comprising:
   an elongate upper slide member of low friction material for engaging and supporting the belt as the belt travels thereover;
   an elongate lower base member configured for being secured to support structure under the belt so that the elongate lower base member extends longitudinally in the downstream travel direction;
   a receptacle in one of the elongate upper slide member and the elongate lower base member and a projection of the other of the elongate upper slide member and the elongate lower base member configured to have a sliding fit in the receptacle for removably connecting the elongate upper slide member and the elongate lower base member with the elongate upper slide member extending longitudinally along the elongate lower base member, wherein elongate upper slide member and the elongate lower base member each have a predetermined lateral width transverse to the downstream travel direction that is substantially the same as each other,
   wherein the receptacle has upper surface portions and the projection has upper surface portions that are spaced from the receptacle upper surface portions with the upper slide member removably connected to the lower base member.

24. A slider bar assembly for supporting a conveyor belt traveling in a downstream travel direction, the slider bar assembly comprising:
   an elongate upper slide member of low friction material for engaging and supporting the belt as the belt travels thereover;
   an elongate lower base member configured for being secured to support structure under the belt so that the elongate lower base member extends longitudinally in the downstream travel direction;
   a receptacle in one of the elongate upper slide member and the elongate lower base member and a projection of the other of the elongate upper slide member and the elongate lower base member configured to have a sliding fit in the receptacle for removably connecting the elongate upper slide member and the elongate lower base member with the elongate upper slide member extending longitudinally along the elongate lower base member, wherein elongate upper slide member and the elongate lower base member each have a predetermined lateral width transverse to the downstream travel direction that is substantially the same as each other, wherein the receptacle comprises multiple receptacles of the lower base member and the projection comprises multiple projections of the upper slide member for being slidingly fit in the multiple receptacles, the upper slide member having a lower surface from which the multiple projections depend with the lower surface laterally extending continuously between and to the projections for being engaged on the lower base member.

25. The slider bar assembly of claim 24 wherein the elongate upper slide member has an upper surface for engaging the belt and a longitudinal end with the upper surface having an end portion that tapers down to the elongate upper slide member longitudinal end for being oriented to face upstream when the elongate upper slide member is removably connected to the elongate lower base member with the upper surface engaging the belt.

26. The slider bar assembly of claim 24 wherein the lower base member has laterally outer side surface portions, and the upper slide member lower surface extends to the lower base member laterally outer side surface portions with the upper slide member removably connected to the lower base member.

* * * * *